(12) United States Patent
Desai

(10) Patent No.: US 6,862,296 B1
(45) Date of Patent: Mar. 1, 2005

(54) RECEIVE DESERIALIZER CIRCUIT FOR FRAMING PARALLEL DATA

(75) Inventor: Chintan Desai, Sunnyvale, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/468,746

(22) Filed: Dec. 21, 1999

(51) Int. Cl.[7] .................................................. H04J 3/06
(52) U.S. Cl. ........................ 370/503; 375/371; 341/100
(58) Field of Search ................................ 370/366, 503, 370/505, 506, 507, 509, 512, 514, 516–518, 520; 375/371; 341/100; 710/30, 71

(56) References Cited

U.S. PATENT DOCUMENTS

| 4,411,007 A | * | 10/1983 | Rodman et al. | 375/356 |
| 4,680,779 A | * | 7/1987 | Wakerly | 370/507 |
| 5,398,249 A | * | 3/1995 | Chen et al. | 370/510 |
| 5,420,895 A | * | 5/1995 | Kim | 370/516 |
| 6,288,656 B1 | * | 9/2001 | Desai | 341/100 |

* cited by examiner

Primary Examiner—Hassan Kizou
Assistant Examiner—David Odland
(74) Attorney, Agent, or Firm—Thelen, Reid & Priest, LLP

(57) ABSTRACT

A receive deserializer circuit which frames parallel data utilizes a skip-bit technique for aligning a predefined data reference pattern with a word clock. The receive deserializer circuit includes a sampling flip flop which receives serial data including a data reference pattern. The sampling flip flop samples and retimes the serial data to a recovered clock. A demultiplexer then deserializes the retimed serial data into a parallel data word which is timed to a word clock from a clock generator. A comparator makes comparisons of the parallel data word with a preset data reference pattern until a match results. A logic controller interprets whether the output of the comparator is a match and generates a shift pulse following each comparison which does not result in a match. The clock generator divides the recovered clock into eight phase clocks. One of the phase clocks is a word clock. Each time the clock generator receives a shift pulse from the logic controller, it disables all the phase clocks by one bit period. This results in a one is bit shift in all the clocks and a one bit shift in the parallel data generated on word clock each time there is no match from the comparator. When a match occurs, no shift pulse is generated by the logic controller, and the predefined data reference pattern and subsequent data words received on word clock are properly framed.

19 Claims, 5 Drawing Sheets

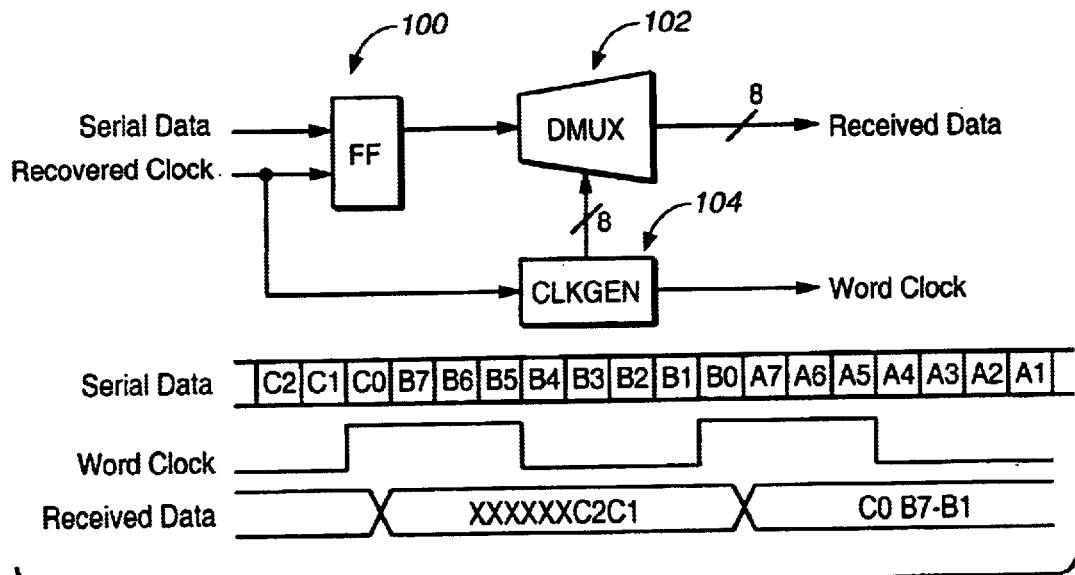
FIG._1
*(PRIOR ART)*
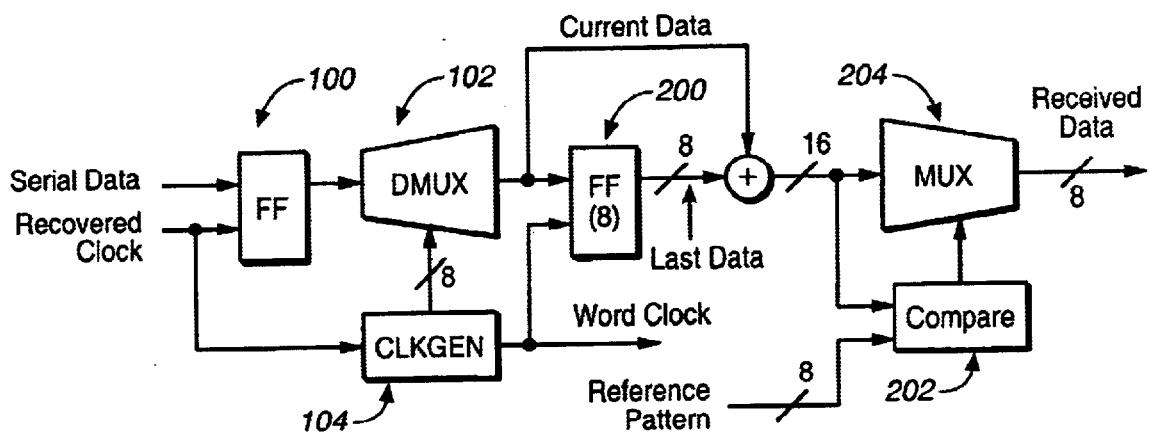
FIG._2
*(PRIOR ART)*

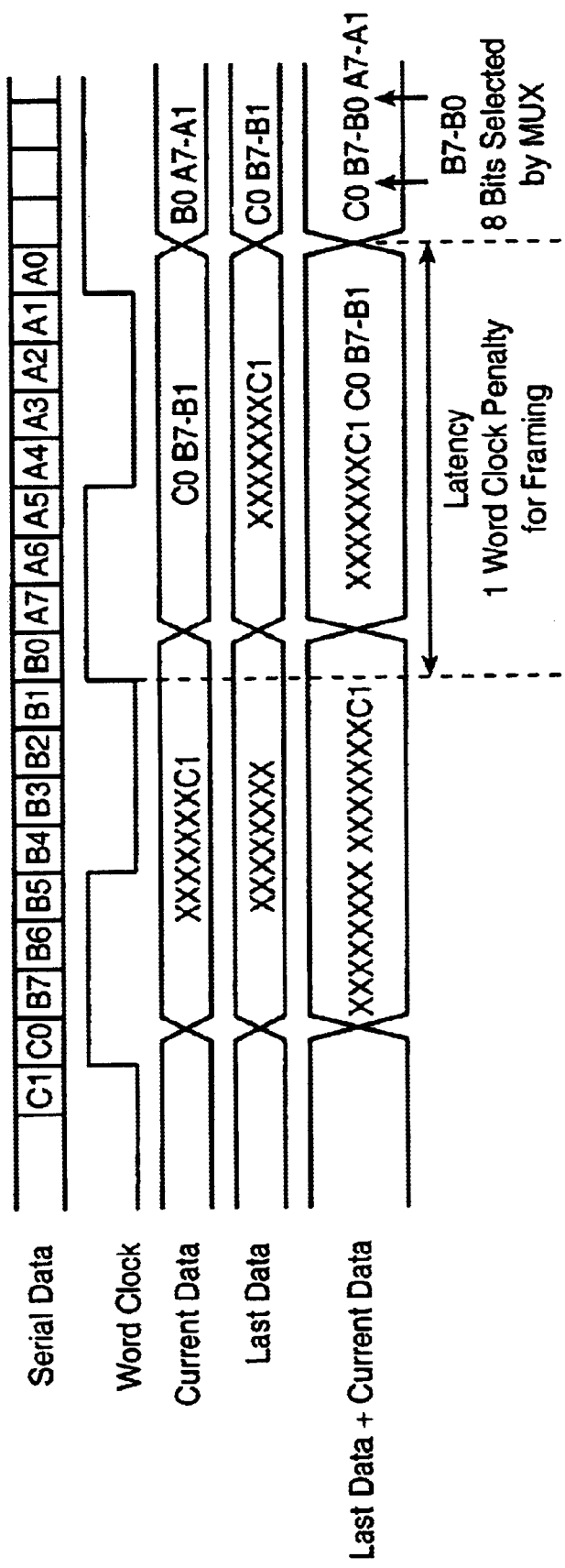
FIG._3
(PRIOR ART)

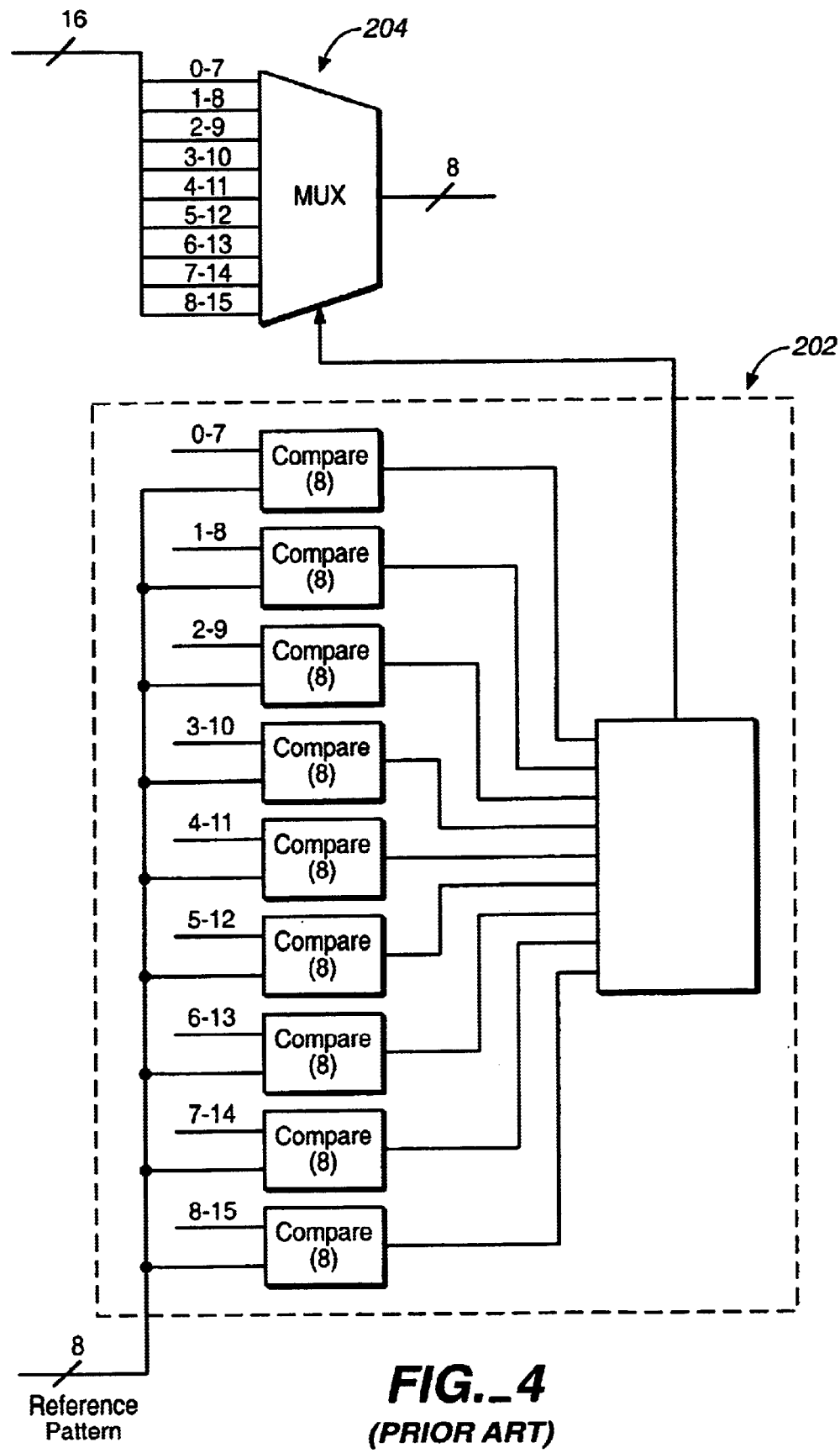
FIG._4
*(PRIOR ART)*

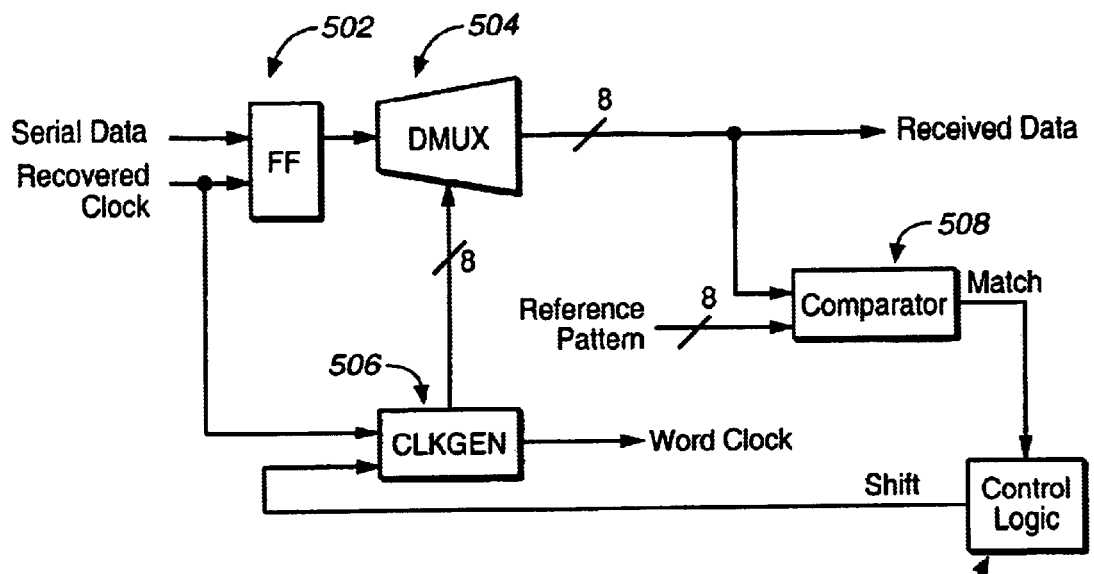
FIG._5
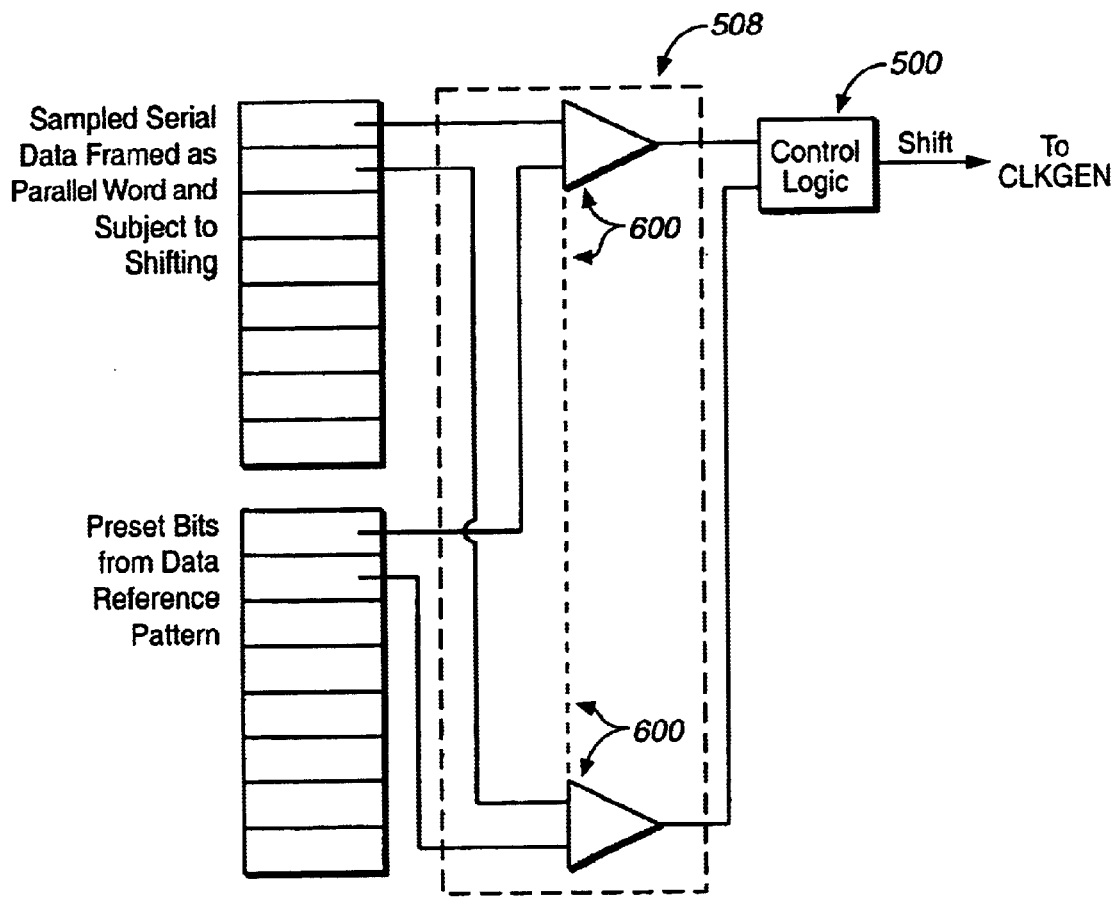
FIG._6

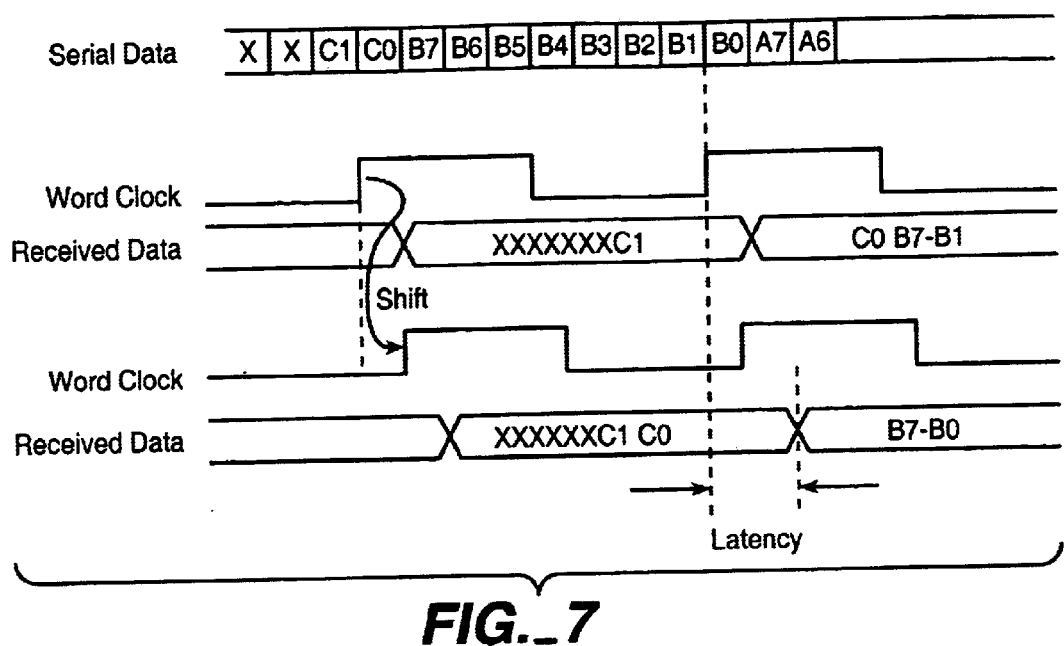
FIG._7

RECEIVE DESERIALIZER CIRCUIT FOR FRAMING PARALLEL DATA

BACKGROUND OF THE INVENTION

1. Field of the Invention

The present invention is generally directed to transceiver applications involving transmitting and receiving parallel data. More specifically, the present invention is directed to framing parallel data generated by a receive deserializer.

2. Background

In a typical transceiver application a transmitter on one chip multiplexes parallel data, an eight bit parallel word for example, at one speed and transmits this data as serial data at a higher speed. A receiver on another chip demultiplexes the serial data and regenerates the eight bit parallel data word. However, the receiver chip has no information as to which bit of the eight bit parallel word is bit zero, the least significant bit (LSB), or which bit is bit seven, the most significant bit (MSB). Thus, information regarding the boundary of the eight bit parallel word has been lost in its transmission. The result is incorrectly framed parallel data words at the receiver which contain some bits belonging to the previous eight bit word or which contain some bits belonging to the next eight bit word.

This framing process is demonstrated generally in FIG. 1, which depicts a block diagram of a typical receiver deserializer along with a timing diagram showing how the received serial data is framed into parallel words based on a word clock. A sampling flip flop 100 receives serial data and retimes it with the rising edge of a recovered clock. The recovered clock is the source of eight phases generated by a clock generator 104. The serial data is sampled by the eight phases to generate eight bits. The eight bits are finally re-timed on one of the phases, channel word clock, to form a parallel data word. With bits $B_7$–$B_0$ making up the original parallel word which was serially transmitted, the timing diagram of FIG. 1 illustrates how in a typical deserializer, the received data can be incorrectly framed as a parallel data word.

Prior methods for solving this problem include the use of additional storage elements to store the last received eight bit word in order to create a new sixteen bit word from the last word and the current word. A block diagram of a deserializer which implements this prior method is shown in FIG. 2. An array of eight storage flip flops 200 is used to store a previously received eight bit word which is then combined with a currently received eight bit word. The new sixteen bit word contains a predefined data reference pattern which is transmitted upon initialization of the circuit. A comparator 202 searches through the new sixteen bit word for the predefined reference pattern and identifies the pattern location to a sixteen-to-eight multiplexer 204. The sixteen-to-eight multiplexer 204 then selects these bits as the correct eight bits to be framed with word clock and output as received data.

The timing diagram of FIG. 3 further illustrates this prior method for framing parallel data as implemented by the circuit of FIG. 2. Where bits $B_7$–$B_0$ represent an eight bit predefined reference pattern, the diagram indicates the combination of current and last data which forms a sixteen bit data word containing this predefined reference pattern. The bit locations of the predefined reference pattern within the sixteen bit data word are found through multiple comparisons made by the comparator 202 of FIG. 2. Once located by the comparator 202, these bit locations are selected by the multiplexer 204 as containing the correct eight bits to be framed with word clock and output as received data.

This and other prior methods of framing parallel data can present significant costs in time and materials when implementing. For example, it is apparent from the timing diagram of FIG. 3 that framing parallel data by the method presented in FIG. 2, introduces unwanted latency. There is a necessary penalty of one word clock associated with the prior method of forming a sixteen bit data word to locate the predefined eight bit reference pattern.

Additionally, increased scrutiny of the block diagram circuit of FIG. 2 indicates the complexity of the circuitry required to implement this prior method, as illustrated in FIG. 4. A circuit framework for the multiplexer 204 and comparator 202 blocks of FIG. 2 is presented in FIG. 4. Though not intended as a complete representation of these circuit blocks, the depiction in FIG. 4 shows the significant hardware required to implement the comparator 202 block of FIG. 2. Nine different sets of bit locations exist within the sixteen bit word where the predefined eight bit reference pattern might be encountered. For example, the predefined eight bit reference pattern could be located in bit locations 0–7, 1–8, 2–9, 3–10, 4–11, 5–12, 6–13, 7–14, or 8–15. It is therefore necessary to dedicate nine sets of eight comparators each to search these locations in order that the multiplexer 204 can select the correct location for framing the parallel data.

The disadvantages apparent in this and other prior methods of framing parallel data can therefore include requirements for additional data storage elements, complex comparator and multiplexer circuits, and unwanted latency inherent to these methods.

Accordingly, there exists a need for an efficient, simple and low latency method for framing the parallel data generated by a receive deserializer circuit.

SUMMARY OF THE INVENTION

A receive deserializer circuit which frames parallel data utilizes a skip-bit technique for aligning a predefined data reference pattern with a word clock. The receive deserializer circuit includes a sampling flip flop which receives serial data including a data reference pattern. The sampling flip flop samples and retimes the serial data to a recovered clock. A demultiplexer then deserializes the retimed serial data into a parallel data word which is timed to a word clock from a clock generator. A comparator makes comparisons of the parallel data word with a preset data reference pattern until a match results. A logic controller interprets whether the output of the comparator is a match and generates a shift pulse following each comparison which does not result in a match. The clock generator divides the recovered clock into eight phase clocks. One of the phase clocks is a word clock. Each time the clock generator receives a shift pulse from the logic controller, it disables all the phase clocks by one bit period. This results in a one bit shift in all the clocks and a one bit shift in the parallel data generated on word clock each time there is no match from the comparator. When a match occurs, no shift pulse is generated by the logic controller, and the predefined data reference pattern and subsequent data words are properly framed on the word clock.

BRIEF DESCRIPTION OF THE DRAWINGS

FIG. 1 is a block and timing diagram of a typical deserializer in accordance with the prior art illustrating a loss of word boundary information upon data transmission.

FIG. 2 is a block diagram of a deserializer circuit in accordance with the prior art illustrating a method for framing parallel data using additional storage elements.

FIG. 3 is a timing diagram illustrating the method for framing parallel data of the deserializer circuit of FIG. 2 in accordance with the prior art.

FIG. 4 is a diagram of the multiplexer and comparator portions of the deserializer circuit of FIG. 2 in accordance with the prior art, illustrating the complexity of implementing the comparator.

FIG. 5 is a block diagram of the deserializer circuit in accordance with a preferred embodiment of the present invention.

FIG. 6 is a diagram of the individual comparators within the comparator block of FIG. 5 in accordance with a preferred embodiment of the present invention.

FIG. 7 is a timing diagram illustrating the method for framing parallel data of the deserializer circuit of FIG. 5 in accordance with a preferred embodiment of the present invention.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a perusal of this disclosure.

A preferred embodiment of the present invention is illustrated in the block diagram schematic of FIG. 5. In this illustration, control logic 500is incorporated into a receive deserializer circuit similar to the circuit shown by the prior art of FIG. 2. The control logic 500initiates the skip-bit framing method of the present invention which eliminates the need for additional flip flop storage elements 200, complex comparators 202, and sixteen-to-eight multiplexers 204 as illustrated in the prior art of FIGS. 2 & 4.

The receive deserializer circuit of FIG. 5 comprises a sampling flip flop 502 which receives serial data from a transmitter circuit (not shown). The serial data includes a data reference pattern which is transmitted from the transmitter upon initialization of the circuit. The data reference pattern is typically, but not necessarily, an eight bit word. The sampling flip flop 502 retimes the serial data to a recovered clock. The recovered clock is a clock which is local to the receiver circuit and which has been aligned on its negative edge with the transition edge of the incoming serial data by a clock recovery module (not shown).

A clock generator 506 divides down the recovered clock and generates eight phase clocks at a frequency eight times slower than the recovered clock. One of the phase clocks is word clock. The serial retimed data is sampled by each phase clock to generate eight bits which are retimed with word clock as parallel data by a demultipler 504. In general, the parallel data word is compared by a comparator 508 which searches for the data reference pattern transmitted from the transmitter upon initialization of the circuit. The control logic 500interprets whether the output of the comparator is a match and generates a shift pulse following each comparison which does not result in a match. When the clock generator 506 receives the shift pulse, it disables all the phase clocks by one bit period. This results in a one bit shift in the clocks with respect to the serial data and a one bit shift in the parallel data generated on word clock. Once the parallel data word contains all bits of the predefined data reference pattern, no shift pulse will be generated by the control logic 500, and the parallel data word and all subsequent data words are properly framed on the word clock.

More specifically, a set of individual comparators 600 as shown in FIG. 6 make up the comparator 508 of FIG. 5. The number of individual comparators 600 is typically eight, but in any event will be equal to the number of bits in the data reference pattern. The individual comparators 600 are typically operational amplifiers or logic gates such as exclusive OR gates. Each individual comparator 600 as shown in FIG. 6, has a first input tied to a preset bit representing a bit from the known data reference pattern. This preset bit is typically hardwired as an input to the individual comparator 600, but could also be set upon initializing the receive deserializer circuit and stored in a storage element which then acts as the first input to an individual comparator 600. The second input to each individual comparator 600 is a corresponding bit from the parallel data word deserialized by the demultiplexer 504 of FIG. 5. The individual comparators 600 indicate a match when the preset bit and the corresponding bit from the parallel data word are the same. The control logic 500effectively ANDs the individual comparator 600 outputs together to determine if there has been a match between all the preset bits and all the bits in the parallel data word. If all the individual comparators 600 do not indicate a match at the same time, the control logic 500generates a shift pulse to the clock generator 506 as indicated in FIG. 5. If all the individual comparators 600 indicate a match at the same time, the control logic 500does not generate a shift pulse, and the parallel data word is then known to contain the data reference pattern, which has thus been properly framed. The subsequent serial data being received on word clock is therefore also properly framed.

In addition to the demonstrated benefits of a reduced need for flip flop storage elements, complex comparators, and sixteen-to-eight multiplexers, the timing diagram as shown in FIG. 7 also illustrates the benefit of reduced latency that is gained by the framing method of the present invention. From the timing diagram of FIG. 7 it is apparent that if the word boundary and word clock is skewed by one bit period, the additional latency will only be one bit period. Furthermore, the maximum latency that can be generated by the framing method of the present invention as illustrated in FIGS. 5 & 7, is four bit periods since the word clock can be effectively shifted in either direction with respect to the sampled serial data and it can never be skewed more than four bit periods away from one of the word boundaries of an eight bit word. By contrast, the latency introduced by the prior art method as shown in the timing diagram of FIG. 3 will always be one word clock cycle, regardless of the amount of initial skew in the word clock and word boundary.

Alternative Embodiments

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A receive deserializer circuit which frames data, comprising:

a sampling flip flop for receiving serial data including a data reference pattern, wherein said sampling flip flop retimes said serial data to a recovered clock as sampled serial data;

a demultiplexer for deserializing said sampled serial data into a parallel data word timed to a word clock from a clock generator;

a comparator for making a comparison of said parallel data word with a preset data reference pattern until said comparison results in a match;

a logic controller for interpreting whether the output of said comparator results in said match and for generating a shift pulse following each of said comparisons which do not result in said match; and said clock generator for dividing said recovered clock into phase clocks, said word clock being one of said phase clocks, and for disabling said phase clocks for a period of one bit upon receipt of said shift pulse, thereby creating a one bit shift in the alignment of said parallel data word being generated on said word clock by said demultiplexer.

2. The circuit as recited in claim 1, wherein said recovered clock is a local clock whose negative edge is pre-aligned with the transition edge of said serial data by a clock recovery module.

3. The circuit as recited in claim 1, wherein said recovered clock is the source clock for said phase clocks.

4. The circuit as recited in claim 1, wherein said preset data reference pattern is derived from a plurality of hard-wired connections.

5. The circuit as recited in claim 1, wherein said preset data reference pattern is derived from data received from a transmitter upon initialization of said circuit.

6. The circuit as recited in claim 1, wherein said comparator is a plurality of comparators whose outputs are combined by said logic controller to determine whether said comparator results in said match.

7. The circuit as recited in claim 6, wherein each of said plurality of comparators has a first and second input, said first input driven by a separate reference bit from said preset data reference pattern and said second input driven by a separate sample bit from said parallel data word.

8. The circuit as recited in claim 6, wherein said plurality of comparators is selected from the group consisting of operational amplifiers, logic gates and combinations thereof.

9. The circuit as recited in claim 6, wherein said plurality of comparators is eight exclusive OR logic gates.

10. A method for framing data in a receive deserializer circuit, comprising:

receiving serial data including a data reference pattern from a transmitter;

retiming said serial data to a recovered clock as sampled serial data;

deserializing said sampled serial data into a parallel data word timed to a word clock;

comparing said parallel data word with a preset data reference pattern until a match results;

generating a shift pulse when said comparing does not result in said match;

dividing said recovered clock into phase clocks, including said word clock; and disabling said phase clocks for one bit period each time said shift pulse is generated, thereby creating a one bit shift in the alignment of said parallel data word being generated on said word clock in a demultiplexer.

11. The method as recited in claim 10, wherein said recovered clock is a local clock whose negative edge is pre-aligned with the transition edge of said serial data by a clack recovery module.

12. The method as recited in claim 10, wherein said recovered clock is the source clock for said phase clocks.

13. The method as recited in claim 10, wherein said preset data reference pattern is derived from a plurality of hard-wired connections.

14. The method as recited in claim 10, wherein said preset data reference pattern is derived from data received from a transmitter upon initialization of said receive deserializer circuit.

15. The method as recited in claim 10, wherein said comparator is a plurality of comparators whose outputs are combined by said logic controller to determine whether said camparator results in said match.

16. The method as recited in claim 15, wherein each of said plurality of comparators has a first and second input, said first input driven by a separate reference bit from said preset data reference pattern and said second input driven by a separate sample bit from said parallel data word.

17. The method as recited in claim 15, wherein said plurality of comparators is selected from the group consisting of operational amplifiers, logic gates and combinations thereof.

18. The method as recited in claim 15, wherein said plurality of comparators is eight exclusive OR logic gates.

19. An apparatus for framing data in a receive deserializer circuit, said apparatus comprising:

means for receiving serial data including a data reference pattern from a transmitter;

means for retiming said serial data to a recovered clock as sampled serial data;

means for deserializing said sampled serial data into a parallel data word timed to a word clock;

means for comparing said parallel data word with a preset data reference pattern until a match results;

means for generating a shift pulse when said comparing does not result in said match;

means for dividing said recovered clock into phase clocks, including said word clock; and means for disabling said phase clocks for one bit period each time said shift pulse is generated, thereby creating a one bit shift in the alignment of said parallel data word being generated on said word clock in a demultiplexer.

* * * * *